June 27, 1967 — J. J. REINKE ET AL — 3,327,340
WINDSHIELD CLEANING SYSTEM
Filed April 1, 1965 — 6 Sheets-Sheet 1

INVENTORS
JAMES J. REINKE
ROBERT P. ROHDE
WILLIAM B. THOMPSON
BY W. E. Finken
THEIR ATTORNEY INVENTORS
JAMES J. REINKE
ROBERT P. ROHDE
WILLIAM B. THOMPSON
BY  W. E. Finker
THEIR ATTORNEY

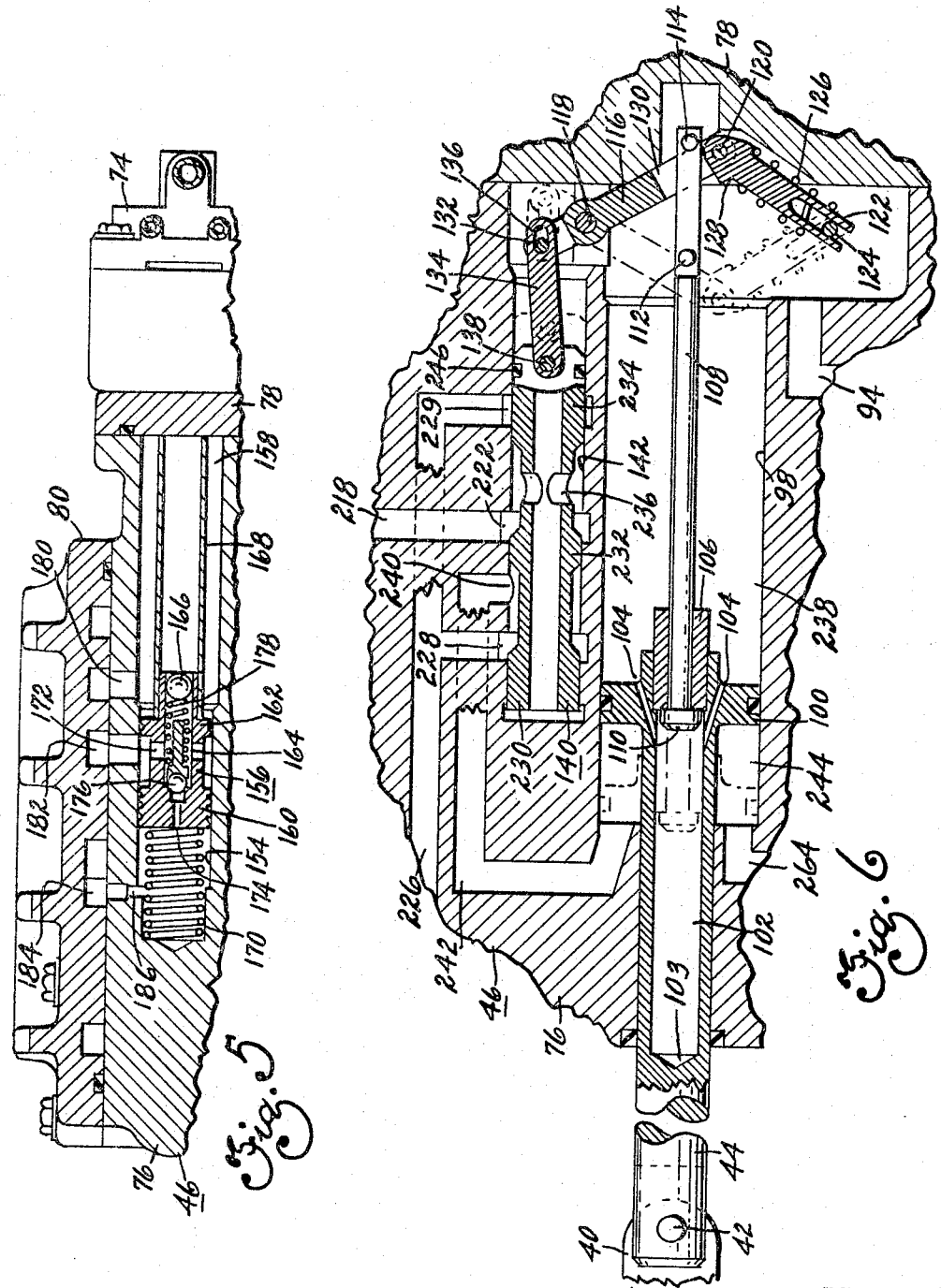

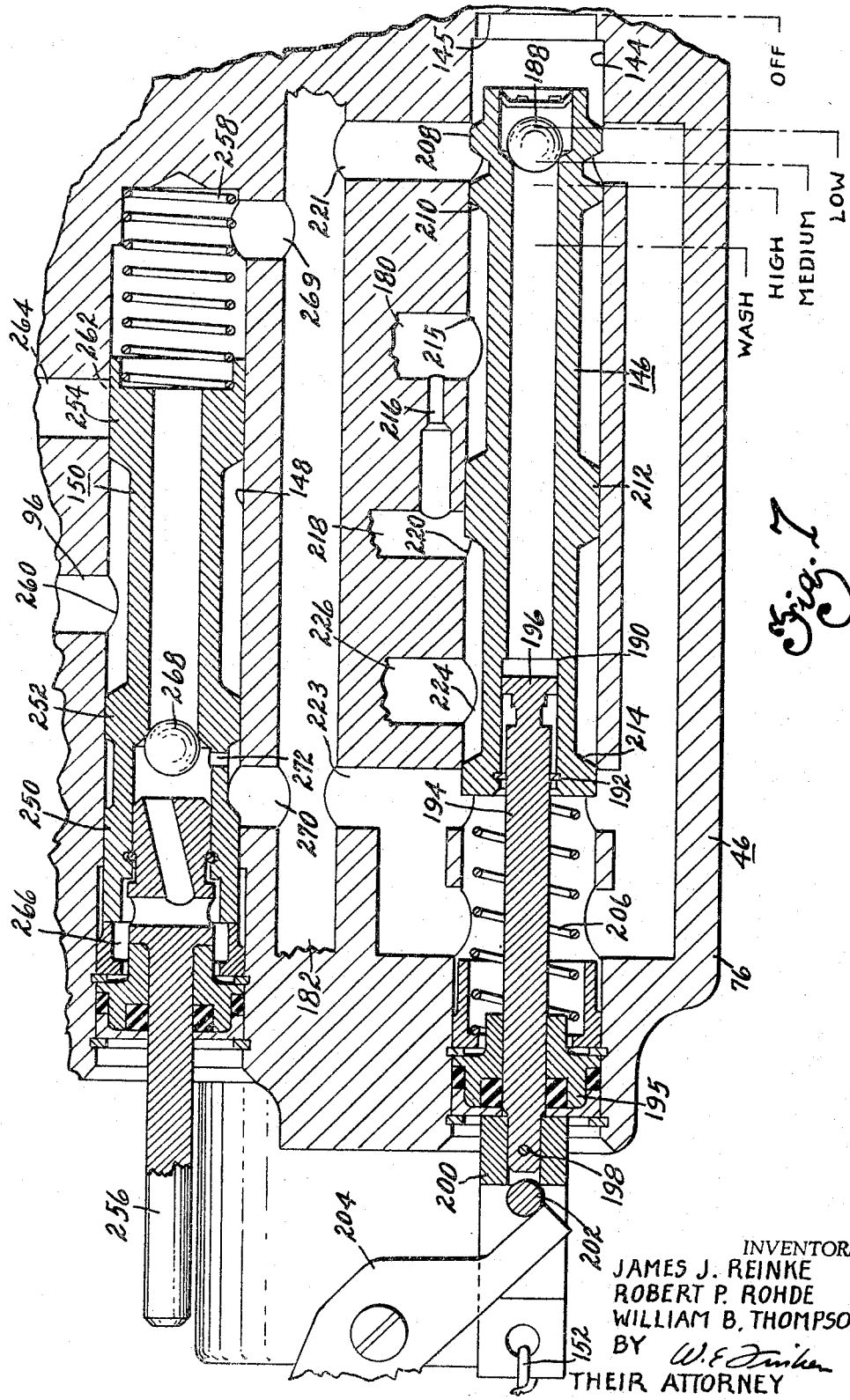

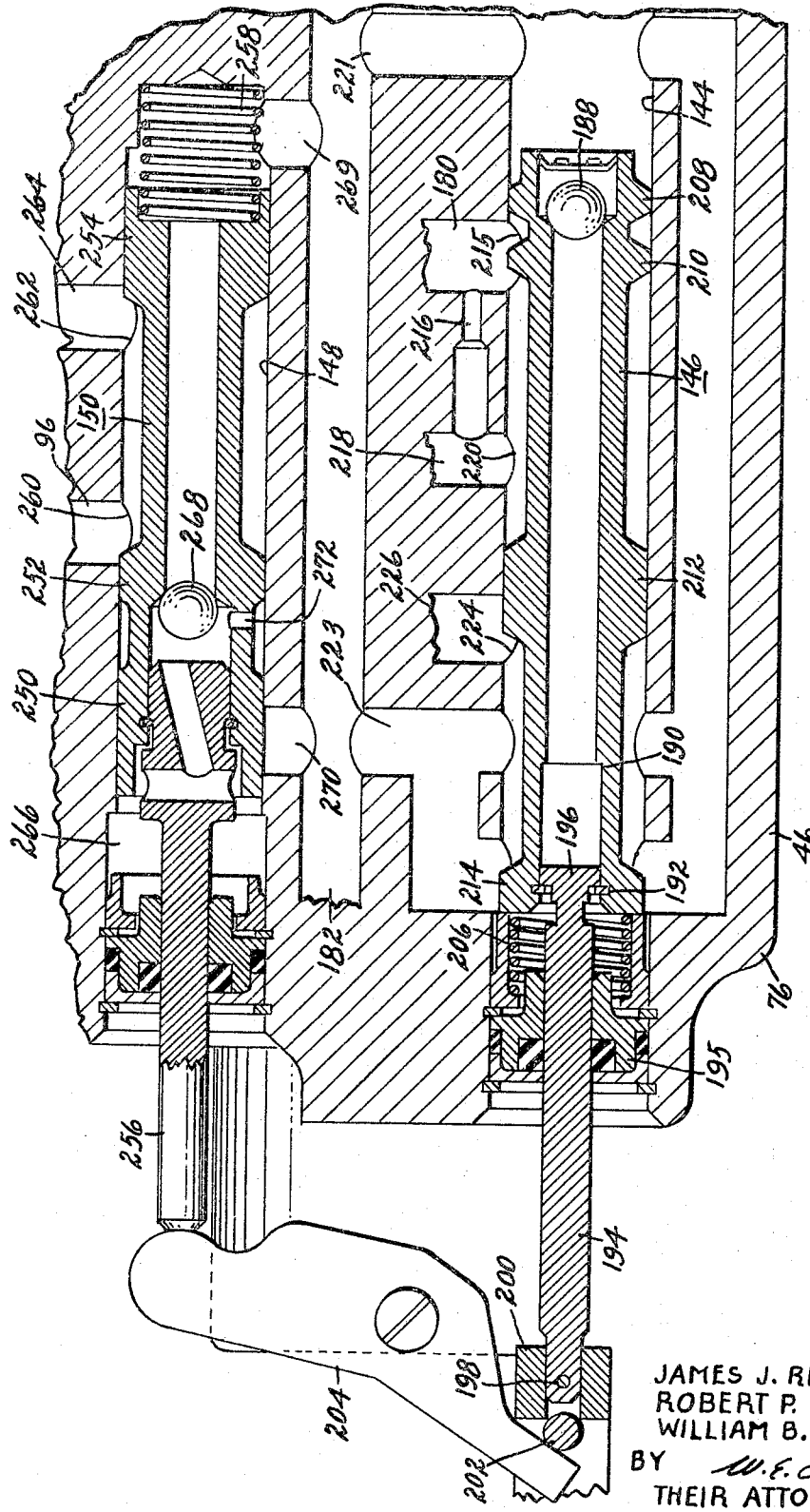

United States Patent Office 3,327,340
Patented June 27, 1967

3,327,340
WINDSHIELD CLEANING SYSTEM
James J. Reinke and Robert P. Rohde, Saginaw, and William B. Thompson, Frankenmuth, Mich., assignors to General Motors Corporation, Detroit, Mich., a corporation of Delaware
Filed Apr. 1, 1965, Ser. No. 444,707
14 Claims. (Cl. 15—250.02)

This invention pertains to windshield cleaning systems, and particularly to an improved hydraulically operated windshield wiper and washer system.

Heretofore, it has been proposed to utilize the return flow from an open center power steering system for actuating a hydraulic windshield motor. The present invention relates to a hydraulically actuated cleaning system including a reciprocating wiper motor capable of moving wiper arm and blade assemblies through running strokes and to depressed parked positions, and a pulsating type windshield washer pump which can be operated conjointly with the wiper motor.

Accordingly, among our objects are the provision of an improved hydraulically operated windshield cleaning system including a wiper unit and a pulsating washer unit capable of conjoint operation; the further provision of a windshield cleaning system of the aforesaid type which operates on a return flow of an open center hydraulic system and including coordinated control means for initiating and timing conjoint operation of the wiper unit and the washer unit; and the still further provision of an improved hydraulically actuated wiper motor of the piston and cylinder type which operates through a normal running stroke and is movable beyond one end of the normal running stroke to a depressed park position whereat its movement is arrested.

The aforementioned and other objects are accomplished in the present invention by utilizing a wiper motor having a piston which operates in the double acting mode during movement of the motor throughout its running stroke, and as a differential area piston to obtain movement beyond one end of its running stroke and to a depressed park position. Piston movement is normally controlled by a directional, or reversing, valve which is effectively disabled during parking operation. The washer unit is adapted for conjoint operation with the wiper unit for an automatically timed interval, after which operation of the washer unit is arrested during continued operation of the wiper unit. The wiper unit is at all times under manual control.

Further objects and advantages of the present invention will be apparent from the following description, reference being had to the accompanying drawings, wherein a preferred embodiment of the present invention is clearly shown and wherein similar numerals depict similar parts throughout the several views.

In the drawings:

FIGURE 5 is an enlarged fragmentary sectional view taken along line 5—5 of FIGURE 2.

FIGURE 6 is a schematic view of the wiper motor and its directional control valve.

FIGURES 7 and 8 are enlarged schematic views of the wiper and washer control valves in different operating positions.

Figure 1:
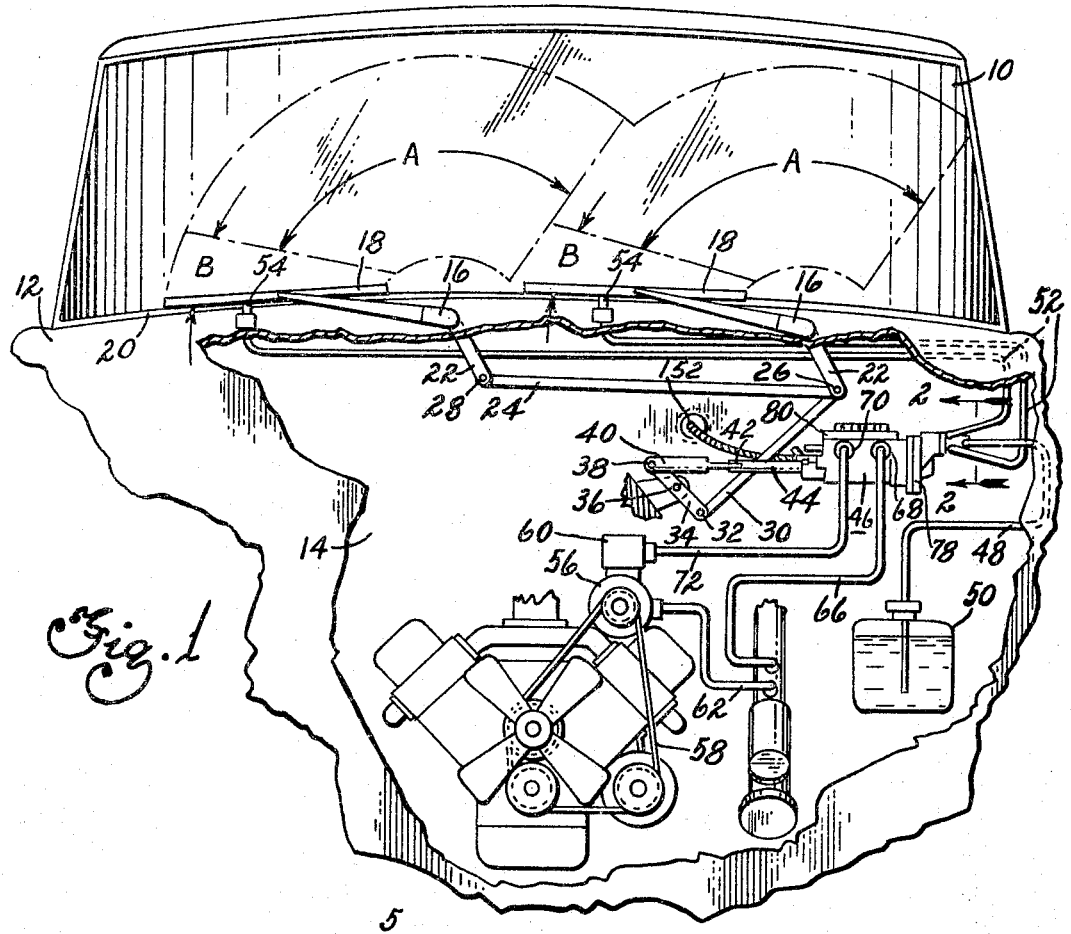
FIGURE 1 is a fragmentary view with certain parts broken away, depicting a vehicle equipment with the windshield cleaning system of the present invention.

Referring to FIGURE 1, a vehicle is shown having a windshield 10 with a forwardly extending cowl 12 and a firewall 14. The vehicle is equipped with a pair of wiper arms 16 comprising spring hinge connected inner and outer sections, the outer sections carrying wiper blades 18 which are oscillatable in tandem across the outer surface of the windshield 10 through out running strokes A and through angles B to depressed park positions whereat they engage the lower reveal molding 20 of the windshield. The inner sections of the wiper arms 16 are attached to pivot shafts, not shown, having crank arms 22 connected thereto, which crank arms are interconnected by a link 24 through pivot joints 26 and 28. The pivot joint 26 is also connected to one end of a drive link 30 which is connected at its other end through pivot joint 32 to one end of a reversing link 34 having an intermediate pivotal support 36. The other end of the reversing link 34 is connected through a pivot joint 38 to a link 40 attached at 42 to a reciprocable piston rod 44. The piston rod 44 extends from a combined wiper unit and washer unit housing 46, the construction of which will be described hereinafter.

The windshield cleaning system also includes a washer unit comprising a pump disposed within the housing 46 which is connected to an inlet conduit 48 that communicates with a reservoir 50 containing liquid solvent and a pair of delivery conduits 52 that connect with spaced nozzles 54 through which the liquid solvent is sprayed onto the windshield 10 into the path of movement of the wiper blades 18. Both the wiper unit and the washer unit operate off the return conduit of an open center hydraulic system which includes a power steering, or accessory, pump 56 driven through a belt 58 from the vehicle engine. The pump 56 communicates with a reservoir 60 from which liquid is drawn and delivered under pressure to a conduit 62 that connects with an open center power steering valve from which hydraulic fluid flows to a return conduit 66. The return conduit 66 is connected with the inlet port 68 of the combined wiper-washer unit housing 46 which also includes a drain port 70 connected to a drain conduit 72 that communicates with the reservoir 60. As will be pointed out hereinafter, hydraulic fluid is permitted to circulate through the housing 46 between the ports 68 and 70 irrespective of whether the wiper unit and washer unit are operating or not.

Figure 2:
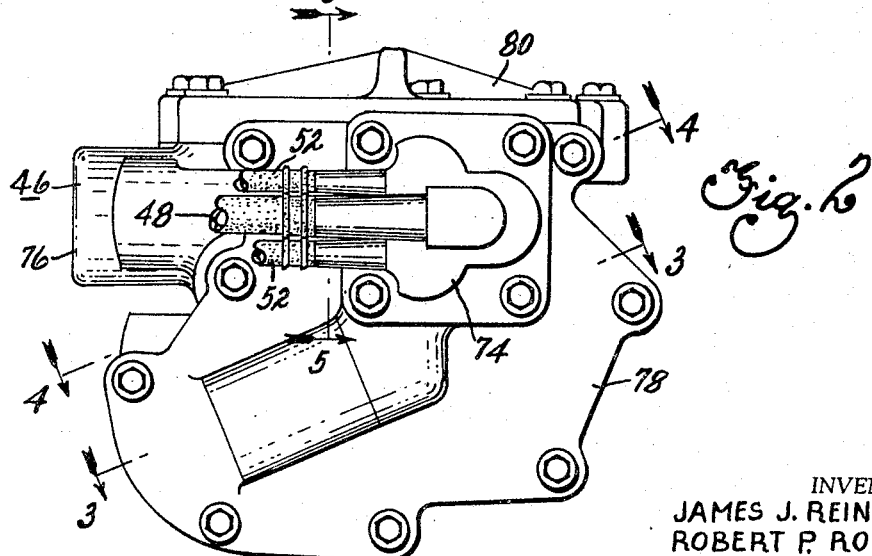
FIGURE 2 is an end view of the combined wiper motor and washer pump taken in the direction of arrow 2 of FIGURE 1.

As seen in FIGURE 2, the conduits 48 and 52 are connected to nipples of a valve housing 74 attached to the combined housing structure 46, which valve housing incorporates one-way inlet check valve means and one-way outlet check valve means, not shown. Referring to FIGURES 2 through 5, the combined housing structure 46 includes a central casting 76 having a cylinder head 78 attached to one end thereof and a manifold plate 80 attached to the top thereof. The washer pump includes an elastomeric bellows liquid displacing element 82 disposed within a cavity 84 in the cylinder head and connected by a pump rod 86 to a double acting piston 88 disposed in a stepped diameter cylinder bore having a rod end chamber 90 and a head end chamber 92. The large chamber is connected to a passage 94 and the small chamber is connected to a passage 96, which passages can be alternately connected to pressure and drain so as to reciprocate the piston 88 and thus effect intermittent delivery and intake strokes of the bellows pump 82 in a manner well known in the art.

The casting 76 contains a second cylinder bore 98 which slidably receives a differential area piston 100 which is integral with the piston rod 44. The piston rod 44 is formed with an elongate cavity 102 having a closed outer end. The cavity 102 communicates with the cylinder bore through piston passages 104. A bushing, or sleeve 106, is press fitted into the piston head 100 and slidably receives a valve actuating rod 108 having an enlarged head 110 at one end and a pair of spaced cross pins 112 and 114 adjacent its opposite end. The spaced cross pins 112 and 114 coact with a toggle action reverser comprising a rocker arm 116 pivoted at 118 to the casting and pivoted at 120 to a lever 122 pivoted on a pin 124 carried by the casting, the lever 122 being encircled by an over-center coil spring 126 acting between the pin 124 and the shoulder 128 on the lever 122. The rod 108, as is clearly seen in FIGURE 3, extends through a slot 130 in the rocker arm 116. The other end of the rocker arm 116 is connected by a pin 132 to a valve actuating link 134, the pin 132 extending through an elongate slot 136 in the link 134. The other end of the link 134 is pivotally connected by a pin 138 to a directional, or reversing, valve 140 mounted for reciprocation in a valve bore 142 of the casting 76.

Figure 4:
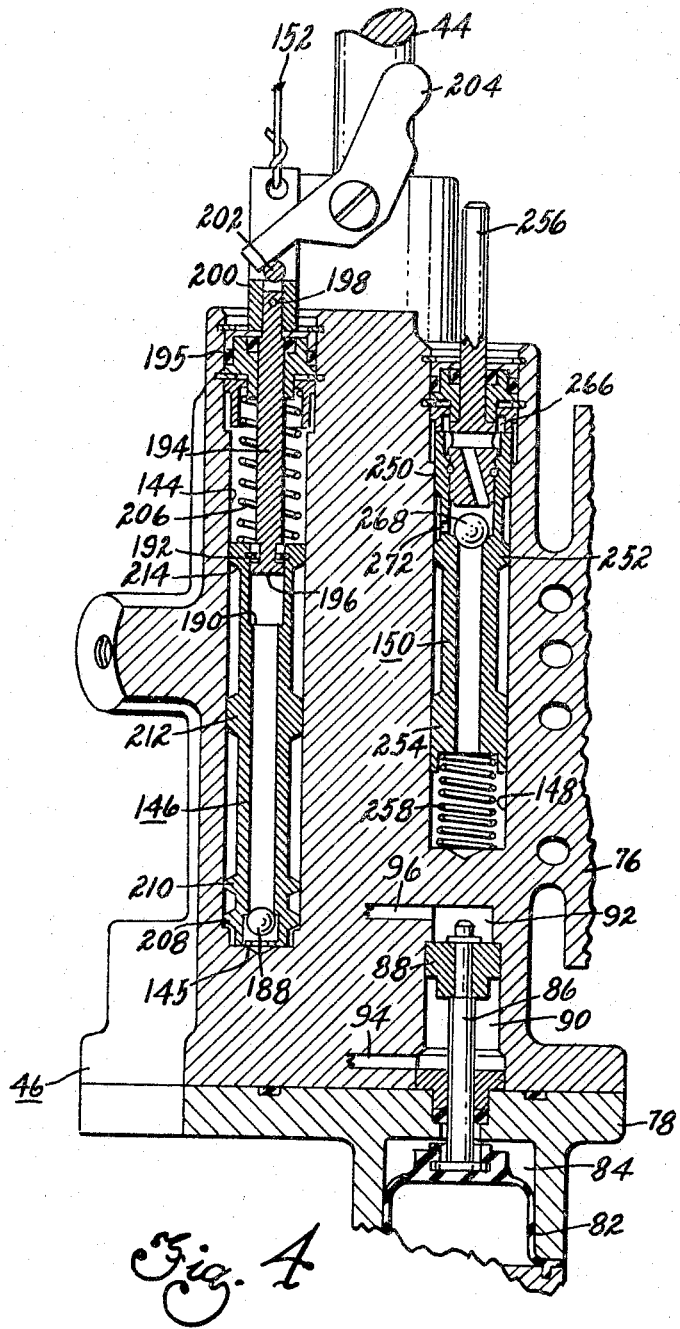
FIGURE 4 is an enlarged fragmentary view, partly in section and partly in elevation, taken along line 4—4 of FIGURE 2.

Referring to FIGURE 4, the casting 76 is also formed with a valve bore 144 which receives a manually operable speed control valve 146 and a valve bore 148 which receives a reciprocable washer control valve 150. The valve 146 is operated through a Bowden wire 152 connected to a knob, not shown, mounted on the instrument panel of the vehicle. In addition, as seen in FIGURE 5, the casting 76 is formed with a fourth valve bore 154 which receives a combined flow control and pressure relief valve assembly 156.

Hydraulic fluid entering the inlet port 68 of the combined wiper-washer housing unit 46 flows into cavity 158 of the casting 76 which is in axial alignment with the valve bore 154. The combined flow control and pressure relief valve assembly 156 comprises a plunger having a pair of spaced lands 160 and 162 with an internal cavity 164, one end of which is closed by a ball plug 166. The plunger has a coaxial tube 168 attached thereto which extends into the cavity 158 and abuts the cylinder head 78 thus constituting a stop limiting movement of the plunger to the right under the urge of a calibrated spring 170. The cavity 164 within the plunger is connected by a plurality of radial ports 172 to the annular space between the lands 160 and 162. Land 160 has an orifice 174 therethrough which is normally closed by a ball-type pressure relief valve 176 which is urged against its seat by a calibrated spring 178. Passage 180 in the casting and the manifold 80 communicates at all times with the cavity 158, and passage 182 communicates with the valve bore 154. A third passage 184 is connected through an orifice 186 to the spring chamber of the valve bore. Operation of the combined flow control and pressure relief valve assembly 156 will be described hereinafter.

With reference to FIGURES 4, 7 and 8, the speed control valve 146 is shown in the "off" position in FIGURE 4, the "start to park" position in FIGURE 7 and the "wash" position in FIGURE 8. The speed control valve 146 comprises a hollow plunger having a one-way check valve 188 at one end, and a shoulder 190 and a snap ring 192 spaced therefrom at the other end. The hollow plunger of the speed valve 146 receives a valve operating rod 194 having an enlarged head 196 confined between the snap ring 192 and the shoulder 190. The rod 194 extends through a seal assembly 195 and is pinned at 198 to a bifurcated operator 200 connected to the Bowden wire 152 and having a cross pin 202. One end of a lever 204 pivoted to the casting 76 extends between the furcations of the operator 200. The speed control valve plunger is biased by a coil spring 206 to the right in FIGURES 7 and 8, and to the left in FIGURE 4, towards the "off" position, and includes spaced lands 208, 210, 212 and 214. Hydraulic fluid from the cavity 158 flows into passage 180, and passage 180 connects with a port 215 in the valve bore 144 and also with a low speed orifice 216 which interconnects passage 180 with passage 218. Passage 218 connects with a port 220 of the valve bore 144. Passage 218 also communicates with passage 184 and orifice 186 of the combined flow control and pressure relief valve assembly (FIGURE 5) and port 222 of the valve bore 142 containing the directional control valve 140. In addition, opposite ends of the valve bore 144 are in continuous communication through passages 221 and 223 with the flow control bypass passage 182 that connects with the drain port 70. Valve bore 144 is formed with a third port 224 communicating with passage 226. Passage 226 connects with spaced ports 228 and 229 of the directional control valve 140.

In the "off" position of the speed control valve 146 as seen in FIGURE 4, the valve plunger abuts the end 145 of the valve bore 144. In this "off" position passages 218 and 226 are interconnected by the annular groove between lands 212 and 214 and the passage 180 is connected to the bypass passage 182 through passage 221 and the annular space between lands 210 and 212. Thus, hydraulic fluid entering the inlet port 68 of the housing 46 will flow through the cavity 158 and the passage 180 to the passage 182 and thence through the drain port 70 to the return line 72. In addition, when the speed control valve 146 is in any of its "on" positions, and the quantity of fluid flowing through the hydraulic system exceeds the demands of the wiper unit and the washer unit, there will be a lower pressure communicated through passage 184 and orifice 186 to the spring cavity of the flow control valve due to the pressure drop through the speed control valve, than exists in the cavity 158 causing the flow control plunger to move to the left at FIGURE 5 to interconnect cavity 158 with the passage 182 which is hereinbefore stated is connected to the drain port 70. On the other hand, if the pressure communicated through passage 184 and the orifice 186 to the spring chamber of the valve 156 should exceed the calibration of the spring 178, the ball valve 176 will open allowing hydraulic fluid to flow through orifice 174 thus creating a pressure unbalance causing the valve 156 to move to the left so as to bypass incoming fluid from the cavity 158 to the passage 182.

Figure 3:
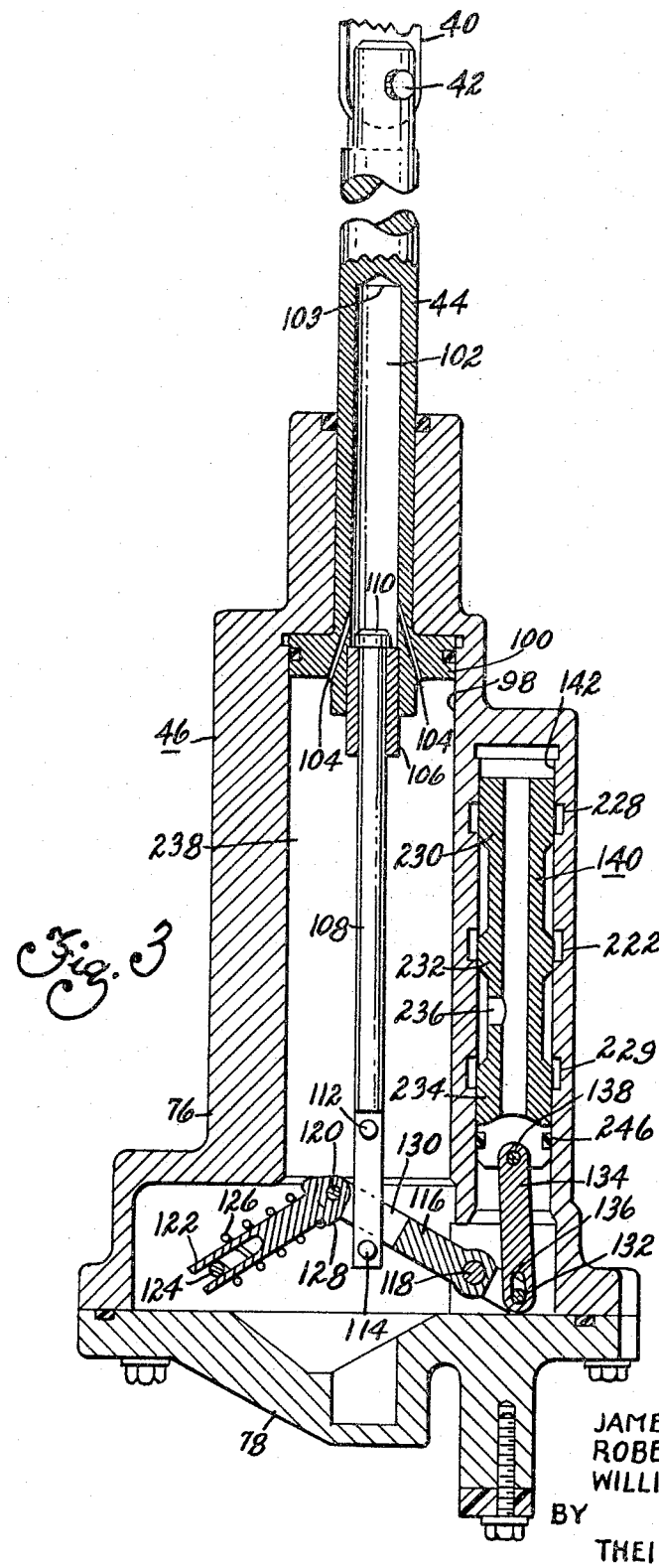
FIGURE 3 is an enlarged view, partly in section and partly in elevation, taken along line 3—3 of FIGURE 2.

Referring to FIGURES 3 and 6, the directional control valve 140 comprises a hollow plunger having spaced lands 230, 232 and 234 with a plurality of passages 236 interconnecting the annular groove between lands 232 and 234 with the central bore thereof. The one end of the valve bore 142 is directly connected to head end chamber 238 of the cylinder bore 98, and the valve bore 142 includes a port 240 connected by passage means 242 to the rod end chamber 244 of the cylinder bore 98. The piston 100 is shown approaching its inboard stroke end position in solid lines in FIGURE 6 and in its parked position in dotted lines. The directional control valve is in a position such that hydraulic fluid under pressure entering port 222 from passage 218 flows through passage 236 and through the valve bore to the head end chamber 238 while the rod end chamber 244 is connected to drain through passage 242, port 240, the annular groove between lands 230 and 232, port 228 and passage 226. As the piston 100 continues to move to the left in FIGURE 6 the pin 114 on the rod 108 will move the rocker arm 116 over center, and the spring 126 will snap the arm 116 and the lever 122 to the dotted line position thus causing pin 132 on the rocker arm to move the directional control valve 140 to the right so that ports 222 and 240 are interconnected by the annular groove between lands 230 and 232, and the passage 236 in the plunger connects the valve bore 142 with the drain passage 226 through port 228. It is pointed out that the slot 136 in the link 134 is elongated so as to delay actuation of the directional control valve plunger by the rocker arm 116 so as to prevent hydraulic fluid lock up of the system which would otherwise be caused if the directional control plunger moved to its mechanical center position at the same time that the over-center spring 126 is in its neutral position. In addition, the valve plunger carries an O-ring 246 which frictionally engages the valve bore 142 so as to prevent movement of the valve plunger due to hydraulic fluid forces.

When the directional control valve 140 has moved to the right in FIGURE 6, the head end chamber 238 is connected to drain while the rod end chamber 244 is pressurized so as to reverse the movement of the piston 100 such that it will move to the right towards the outboard stroke end position whereat the pin 112 on the valve actuating rod 108 will again move the rocker arm linkage over-center. It is pointed out that the valve rod 108 does not move continuously with the piston 100, but is only actuated adjacent the stroke ends thereof by virtue of the enlarged head 100 engaging either the sleeve 106 or the end 103 of the cavity 102 in the piston rod 44.

The several positions of the speed control valve 146 in the speed controlling range are indicated by the broken lines in FIGURE 7, these broken lines indicating the right end of the plunger. Thus, in the low speed position hydraulic fluid enters passage 180 and flows to passage 218 through the restricted orifice 216. As the plunger is moved to the left towards the high speed position, the land 212 opens the port 220 to the passage 180 through the annular channel between lands 210 and 212 such that in the high speed position the port 220 is in full open communication with the port 215.

To initiate parking movement of the wiper motor so as to arrest the wiper unit, the speed control valve 146 is moved to the position of FIGURE 7 wherein the actuating rod 194 is moved to its innermost position. In this position the spring 206 acts to move the speed control valve plunger inwardly so as to abut the end 145 of the valve bore. However, movement of the valve plunger is restricted by fluid trapped between the land 208 and the end of the valve bore, which constitutes a dashpot, which must bleed by the land to the passages 221 and 182. With the speed control valve in the position of FIGURE 7, it can be seen that both passages 218 and 226 are pressurized from the passage 180, the passage 218 being pressurized through the orifice 216, and the passage 226 being pressurized from passage 218 through ports 220 and 224. Simultaneous pressurization of passages 218 and 226 effectively disables the reversing valve 140. Accordingly, hydraulic fluid under pressure will be supplied to both chambers of the cylinder bore 98. Since the head end of the piston exposed to head end chamber 238 is of greater area than the rod end of the piston by virtue of the fact that the entire head end of the piston is subjected to pressure including the end 103 of the piston rod cavity through passages 104, the piston 100 will continue to move to the left beyond its normal inboard stroke end position. As the piston 100 moves beyond its normal inboard stroke end position the directional control valve 140 will shift to the right, but since both passages 218 and 226 are pressurized, the piston 100 will continue to move to the left until it engages the end of the cylinder bore 98.

Thus, during parking movement of the wiper motor the piston 100 acts as a differential area piston having both ends subjected to the same pressure potential. Concurrently with movement of the wiper motor piston 100 to its depressed parked position, the spring 206 will continue to move the speed control valve 146 until it engages the end walls 145 of its valve bore 144, and when the speed control valve reaches its end position the incoming hydraulic fluid from passage 180 will flow directly to the bypass passage 182 through the annular channel between lands 210 and 212 and passage 221 thus providing an open center system.

Referring to FIGURES 4, 7 and 8, the wash valve 150 disposed within the valve bore 148 comprises a plunger having spaced lands 250, 252 and 254, and is biased outwardly by a spring 258. The plunger is actuated by a valve rod 256. The valve bore 148 is connected at both ends with the bypass passage 182 through passages 269 and 270. When the speed control valve 146 is moved to its outermost position by the Bowden cable 152 through the rod 194, the lever 204 is actuated from the position of FIGURE 7 to the position of FIGURE 8 so as to move the rod 256 and the wash control valve 150 inwardly thereby compressing spring 258. Upon release of the Bowden wire 152, the speed control valve 146 is returned to its high speed position by means of the spring 206.

The passage 94 connecting with the rod end chamber of the washer motor cylinder 90 is connected at all times with the head end chamber 236 of the wiper motor. The head end chamber 92 is connected at all times to passage 96, and the passage 96 communicates with port 260 of the valve bore 148. When the wash valve is actuated as shown in FIGURE 8, port 260 is interconnected by the annular groove between lands 252 and 254 to port 262 which communicates with passage 264, passage 264 communicating at all times with the rod end chamber 244 of the wiper motor. Accordingly, the washer pump piston 88 will reciprocate since the chambers 90 and 92 on opposite sides thereof are alternately connected to pressure and drain in accordance with the alternate connection to pressure and drain of the wiper motor chambers 238 and 244. Thus, the bellows 82 will be alternately collapsed and expanded so as to deliver intermittent squirts of liquid solvent onto the windshield.

During this conjoint operation of the wiper unit and the washer unit, the spring 258 acts on the washer control valve 150 to move it towards its "off" position, but this movement is controlled by fluid being trapped in chamber 266 by one-way check valve 268. The bleed rate, or the time interval of conjoint operation of the wiper unit and the washer unit is controlled by the load on the springs 258 and the clearance between the land 250 and the valve bore 148 so as to provide the desired time interval of washer unit operation. Thus, the land 250 and chamber 266 constitute a dashpot. However, when the annular groove between lands 250 and 252 communicates with bypass passage 182 through passage 270, the fluid trapped in the chamber 266 will immediately flow through orifice 272 so as to rapidly return the wash valve 150 to its "off" position. In this manner operation of the washer unit will be abruptly arrested thereby precluding low pressurization of the washer pump piston due to restriction of flow through the port 262 by the land 254.

From the foregoing it is manifest that one aspect of the present invention provides a wiper unit actuated from an open center hydraulic system including a wiper motor having a reciprocable piston subject to differential pressures in alternate directions to reciprocate the same through a running stroke, the piston being of the differential area type such that simultaneous pressurization of the opposed cylinder chambers results in extending the stroke of the piston beyond the normal running stroke to a depressed parked position. In another aspect the present invention provides a hydraulically operated wiper motor and a hydraulically operated pulsating washer unit with control means operable to hydraulically interconnect the unit to effect conjoint operation thereof together with means for timing the interval of conjoint operation and thereafter automatically arresting operation of the washer unit.

While the embodiment of the present invention as herein disclosed constitutes a preferred form, it is to be understood that other forms might be adopted.

What is claimed is as follows:

1. A hydraulically operated windshield cleaning system including, a hydraulically operated wiper unit, a hydraulically operated pulsating washer unit, means operable to hydraulically interconnect said units to effect conjoint operation thereof, and means operable during said conjoint operation to maintain said hydraulic interconnection and continue operation of said washer unit for a timed interval and then automatically arrest said washer unit.

2. A hydraulically operated windshield cleaning system including, a hydraulically operated wiper unit, a hydraulically operated pulsating washer unit, first control means for effecting independent operation of said wiper unit, second control means operable to hydraulically interconnect said units to effect conjoint operation thereof, and means operable during said conjoint operation to maintain said hydraulic interconnection and continue operation of said washer unit for a timed interval and then automatically interrupt said connection to arrest said washer unit.

3. A hydraulically operated windshield cleaning system including, a hydraulically operated wiper unit, a hydraulically operated pulsating washer unit, means operable to hydraulically interconnect said units to set said both units in operation for conjoint operation, and dashpot means operable during said conjoint operation for maintaining said hydraulic interconnection to continue operation of said washer unit for a timed interval and then automatically arrest said washer unit.

4. A hydraulically operated windshield cleaning system including, a wiper unit comprising a motor having a reciprocable piston subject to differential pressures in alternate directions to reciprocate the same, a washer unit comprising a liquid displacing member and a washer motor having a reciprocable piston subjected to differential pressures in alternate directions to reciprocate the same and effect alternate intake and delivery strokes of said liquid displacing member, means operable to hydraulically interconnect the wiper motor and the washer motor to effect conjoint operation of the washer unit with the wiper unit, and means operable during said conjoint operation to maintain said hydraulic interconnection and continue said conjoint operation for a timed interval and then automatically interrupt said hydraulic interconnection to arrest said washer unit.

5. The windshield cleaning system set forth in claim 4 wherein said washer motor includes a cylinder having chambers on opposite sides of said piston, wherein said wiper motor includes a cylinder having chambers on opposite sides of said wiper piston, and passage means continuously interconnecting one chamber of said washer motor and one chamber of said wiper motor.

6. The windshield cleaning system set forth in claim 5 wherein the means operable to hydraulically interconnect the washer unit and the wiper unit comprises a valve disposed between the other chambers of said wiper motor and said washer motor, said valve having a first position wherein the hydraulic interconnection between said other chambers is blocked and a second position wherein the hydraulic interconnection between said other chambers is established.

7. The windshield cleaning system set forth in claim 6 wherein said washer valve comprises a reciprocable hollow plunger having a one-way check valve operable to close the passage therethrough, spring means normally maintaining said plunger in said first position, and manual means for moving said valve from said first position to said second position.

8. The windshield cleaning system set forth in claim 7 wherein the means for maintaining said hydraulic interconnection for a timed interval comprises a dashpot chamber at one end of said plunger acting in opposition to said spring, said check valve opening to permit unrestricted movement of said plunger from said first position to said second position but closing to prevent unrestricted movement from said second position to said first position, and means to bleed said dashpot chamber to drain to determine the timed interval during which said spring moves said plunger from said second position to said first position.

9. A hydraulically operated wiper motor comprising a cylinder having a differential area reciprocable piston therein, a reversing valve actuated by the piston adjacent the ends of its running stroke for subjecting opposite sides of the piston to differential pressures in alternate directions, and means operable to move said piston beyond one end of its normal running stroke to a parked position by simultaneous pressurization of both sides of said differential area piston.

10. A hydraulically operated wiper motor comprising a cylinder having a differential area reciprocable piston therein, a reversing valve for subjecting opposite sides of the piston to differential pressures in alternate directions to reciprocate the same, means operable by said piston to effect snap action movement of said reversing valve between first and second positions adjacent the ends of the running stroke of said piston, and means operable to simultaneously pressurize both sides of said differential area piston to move the piston beyond one end of its normal running stroke to a parked position.

11. A hydraulically operated wiper motor comprising a cylinder having a differential area reciprocable piston therein, a reversing valve actuated by the piston adjacent the ends of its running stroke for subjecting opposite sides of said piston to differential pressurization in alternate directions, and a control valve having a first position for directing flow of hydraulic fluid to the reversing valve to control the speed of the piston movement, said control valve having a second position for pressurizing both sides of said piston through said reversing valve to move said piston beyond one end of its normal running stroke to a parked position.

12. A hydraulically operated wiper motor comprising a cylinder having a differential area reciprocable piston therein, a reciprocable reversing valve for subjecting opposite sides of the piston to differential pressures in alternate directions to reciprocate the same throughout a running stroke, a toggle action reverser for snapping said reversing valve between its end positions, and a manually operable control valve having a first position for directing hydraulic fluid to the reversing valve to control the speed of piston movement, said control valve having a second position for simultaneously pressurizing both sides of said piston through said reversing piston to move said valve beyond one end of its running stroke to a parked position, said toggle action reverser comprising a reciprocable valve rod slidably supported within said piston and engageable by said piston adjacent each end of its running stroke, a rocker arm pivoted to said cylinder having one end engageable with said valve actuating rod and the other end operatively connected to said reversing valve, and a second lever pivoted to said cylinder and to said rocker arm and carrying an over-center spring for effecting a snap action movement of said rocker arm when the piston reaches either end of its running stroke.

13. The wiper motor set forth in claim 12 wherein the operative connection between said rocker arm and said reversing valve comprises a link pivoted to said reversing valve and having an elongate slot through which it is pivotally connected to said rocker arm so as to preclude lock up of said reversing valve in its centered position.

14. The wiper motor set forth in claim 12 wherein said control valve comprises a hollow reciprocable plunger having a one-way check valve at one end for closing the passage therethrough, spring means biasing said valve towards its "off" position, and a dashpot chamber acting in opposition to said spring means for restricting movement of said valve to its "off" position so as to assure movement of said motor piston to its parked position.

References Cited

UNITED STATES PATENTS

| | | | |
|---|---|---|---|
| 2,869,165 | 1/1959 | Dermond | 15—250.02 |
| 2,882,545 | 4/1959 | Kelley et al. | 15—250.02 |
| 3,131,640 | 5/1964 | Rohde | 15—250.02 X |
| 3,264,669 | 8/1966 | D'Alba | 15—250.02 |

CHARLES A. WILLMUTH, *Primary Examiner.*